US012715291B2

(12) United States Patent
Balch et al.

(10) Patent No.: US 12,715,291 B2
(45) Date of Patent: Aug. 25, 2026

(54) SYSTEMS AND METHODS FOR ENHANCING INSTRUCTIONS PROVIDED BY A VEHICULAR VIRTUAL ASSISTANT

(71) Applicant: Toyota Research Institute, Inc., Los Altos, CA (US)

(72) Inventors: Thomas M. Balch, Damariscotta, ME (US); Emily Sarah Sumner, Cambridge, MA (US); Guy Rosman, Cambridge, MA (US); Jonathan A DeCastro, Arlington, MA (US); Deepak Edakkattil Gopinath, Washington, DC (US); Andrew Michael Silva, Cambridge, MA (US); Xiongyi Cui, Somerville, MA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 77 days.

(21) Appl. No.: 18/897,522

(22) Filed: Sep. 26, 2024

(65) Prior Publication Data

US 2026/0084527 A1 Mar. 26, 2026

(51) Int. Cl.
*B60K 35/28* (2024.01)

(52) U.S. Cl.
CPC ........ *B60K 35/28* (2024.01); *B60K 2360/161* (2024.01)

(58) Field of Classification Search
CPC .......................... B60K 35/28; B60K 2360/161
See application file for complete search history.

(56) References Cited

U.S. PATENT DOCUMENTS 9,085,303 B2 7/2015 Wolverton et al.
2014/0136013 A1* 5/2014 Wolverton ............. B60K 35/28 701/1
2018/0061146 A1* 3/2018 Bode ...................... G07C 5/006
2022/0185111 A1 6/2022 Biswal et al.
2025/0378487 A1* 12/2025 Vinod ................ G06Q 30/0633

OTHER PUBLICATIONS

WorxAR_1, Tradiebot Industries Channel https://www.youtube.com/watch?v=rdP9Fdt9wLw WorxAR_2, https://youtu.be/7fBPSjctbpk (Year: 2019).*

(Continued)

*Primary Examiner* — Erin M Piateski
*Assistant Examiner* — Hajar Hassaniardekani
(74) *Attorney, Agent, or Firm* — Christopher G. Darrow; Darrow Mustafa PC

(57) ABSTRACT

Systems and methods for enhancing instructions provided by a vehicular virtual assistant are disclosed herein. One embodiment of a virtual assistant enhancement system includes a plurality of markers installed in a vehicle in a corresponding plurality of different locations. The system activates, via a generative artificial intelligence (AI)-based virtual assistant of the vehicle, one or more of the plurality of electronic markers. The system also refers to the one or more activated electronic markers in instructions communicated to a user by the generative AI-based virtual assistant to assist the user in performing a task pertaining to the vehicle.

11 Claims, 6 Drawing Sheets

(56) References Cited

OTHER PUBLICATIONS

Goh Eg, et al. “Marker-based Augmented Reality Application for Car Basic Maintenance.” International Journal of Innovative Computing 13.2 (2023): 75-82) (Year: 2023).*
Russel Younghusband https://www.getac.com/us/blog/augmented-reality-for-automotive-repair/ (Year: 2022).*
ARPost: https://arpost.co/2019/04/18/tradiebot-worxar-app-augmented-reality-car-mechanics/ (Year: 2019).*
Goluguri et al., “Virtual Assistant Manual” Toyota Connected (2019). Retrieved from the Internet: https://www.toyotaconnected.com/insights/virtual-assistant-manual, retrieved Jun. 27, 2024. 5 pages.
Innovation News Daily, “Virtual Assistant Replaces Driver’s Manual in Interactive Car” NBC News (2011)/ Retrieved from the Internet: https://www.nbcnews.com/id/wbna44230696, retrieved Jun. 27, 2024 . 2 pages.
Andrew J. Hawkins, “Mercedes-Benz’s best-in-class voice assistant is getting an AI boost” The Verge (2024) Retrieved from the Internet: https://www.theverge.com/2024/1/9/24028012/mercedes-benz-mbux-voice-assistant-ai-llm-mbos-ces, retrieved Jun. 27, 2024. 5 pages.
Lawrence Bonk, “Amazon and BMW are replacing the driver’s manual with AI” Engadget (2024) Retrieved from the Internet: https://www.engadget.com/amazon-and-bmw-are-replacing-the-drivers-manual-with-ai-173031770.html?guccounter=1, retrieved Jun. 27, 2024. 2 pages.

* cited by examiner

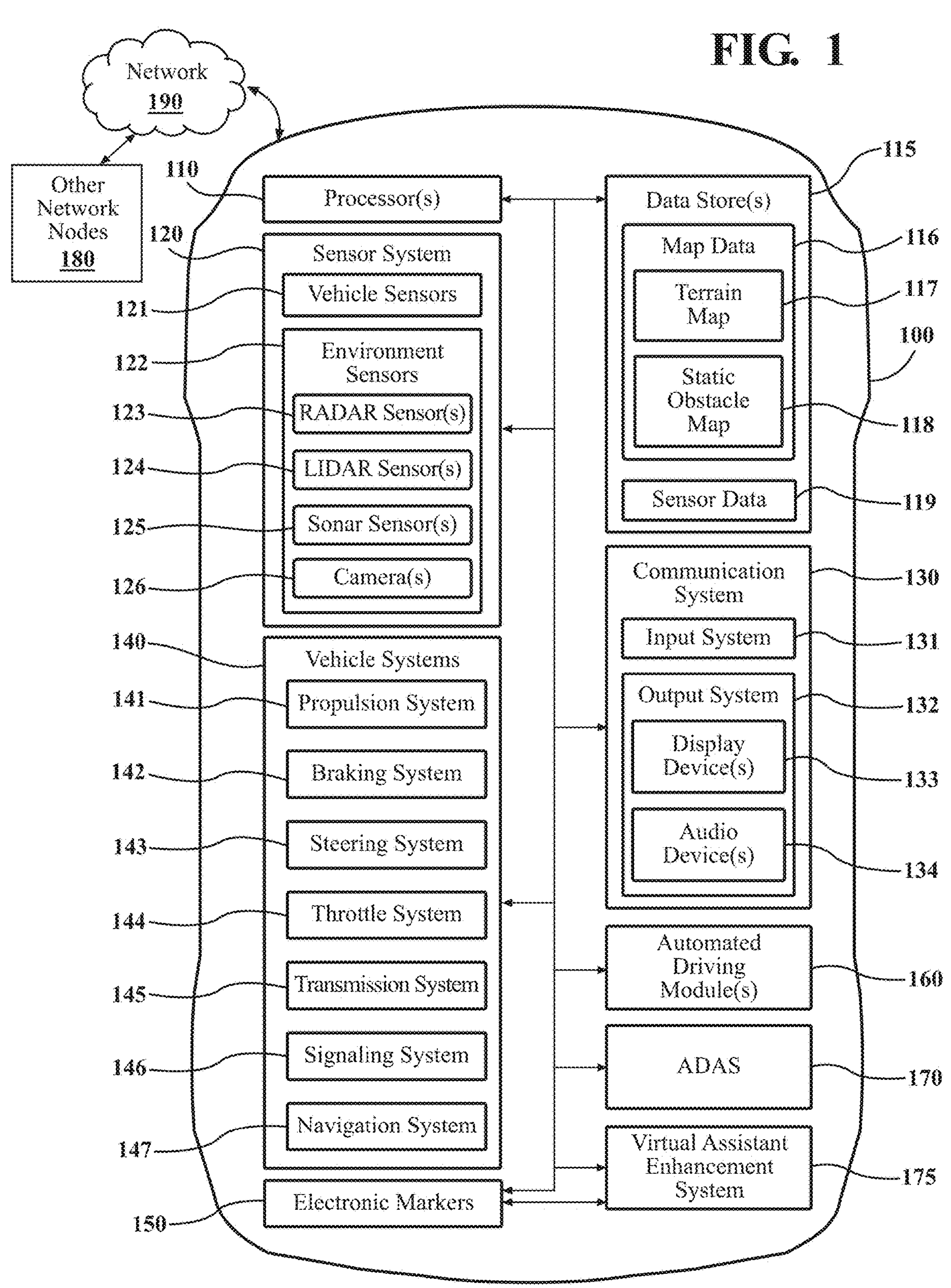
FIG. 1
Network
190
Other Network Nodes
180
110
Processor(s)
120
Sensor System
121
Vehicle Sensors
122
Environment Sensors
123
RADAR Sensor(s)
124
LIDAR Sensor(s)
125
Sonar Sensor(s)
126
Camera(s)
140
Vehicle Systems
141
Propulsion System
142
Braking System
143
Steering System
144
Throttle System
145
Transmission System
146
Signaling System
147
Navigation System
150
Electronic Markers
115
Data Store(s)
116
Map Data
117
Terrain Map
100
Static Obstacle Map
118
Sensor Data
119
Communication System
130
Input System
131
Output System
132
Display Device(s)
133
Audio Device(s)
134
Automated Driving Module(s)
160
ADAS
170
Virtual Assistant Enhancement System
175

Network
245
Other Network Nodes
240
Virtual Assistant Enhancement System 175
Database 225
Electronic Markers Registry
230
User Data
232
Vehicle Data
235
Processor(s)
205
Memory 210
Marker Reference Module
215
Generative AI Module
220
Electronic Markers
150

SYSTEMS AND METHODS FOR ENHANCING INSTRUCTIONS PROVIDED BY A VEHICULAR VIRTUAL ASSISTANT

TECHNICAL FIELD

The subject matter described herein generally relates to vehicles and, more particularly, to systems and methods for enhancing instructions provided by a vehicular virtual assistant.

BACKGROUND

Virtual assistants are becoming increasingly popular in a variety of applications, including in vehicles. Vehicular virtual assistant technology can be improved to better assist drivers and other vehicle occupants.

SUMMARY

An example of a system for enhancing instructions provided by a vehicular virtual assistant is presented herein. The system comprises a plurality of electronic markers installed in a vehicle in a corresponding plurality of different locations. The system also includes a processor and a memory storing machine-readable program code that, when executed by the processor, causes the processor to activate, via a generative artificial intelligence (AI)-based virtual assistant of the vehicle, one or more of the plurality of electronic markers. The memory also stores machine-readable program code that, when executed by the processor, causes the processor to refer to the one or more of the plurality of electronic markers in instructions communicated to a user by the generative AI-based virtual assistant to assist the user in performing a task pertaining to the vehicle.

Another embodiment is a non-transitory computer-readable medium for enhancing instructions provided by a vehicular virtual assistant and storing program code that, when executed by a processor, causes the processor to activate, via a generative artificial intelligence (AI)-based virtual assistant of a vehicle, one or more of a plurality of electronic markers installed in the vehicle in a corresponding plurality of different locations. The program code also causes the processor to refer to the one or more of the plurality of electronic markers in instructions communicated to a user by the generative AI-based virtual assistant to assist the user in performing a task pertaining to the vehicle.

In another embodiment, a method of enhancing instructions provided by a vehicular virtual assistant is disclosed. The method comprises installing, in a vehicle, a plurality of electronic markers in a corresponding plurality of different locations. The method also includes activating, via a generative artificial intelligence (AI)-based virtual assistant of the vehicle, one or more of the plurality of electronic markers. The method also includes referring to the one or more of the plurality of electronic markers in instructions communicated to a user by the generative AI-based virtual assistant to assist the user in performing a task pertaining to the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 1 illustrates a vehicle in which various embodiments of the systems and methods disclosed herein can be implemented.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Figure 2:
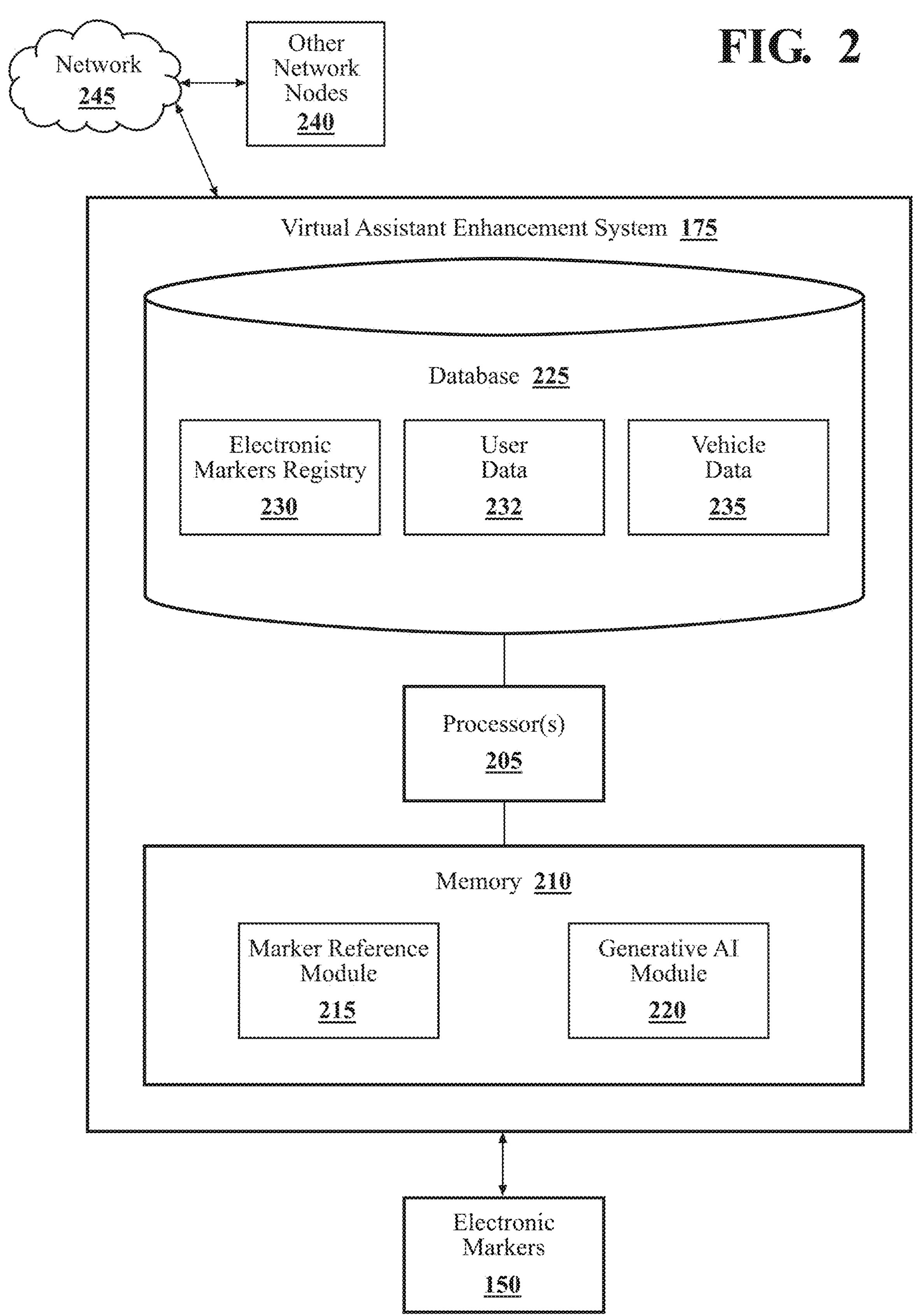
FIG. 2 is a block diagram of a virtual assistant enhancement system, in accordance with an illustrative embodiment of the invention.

Various embodiments of systems and methods for enhancing instructions provided by a vehicular virtual assistant described herein improve existing virtual assistants by activating, via a generative artificial intelligence (AI)-based virtual assistant of a vehicle, one or more of a plurality of electronic markers installed in the vehicle in a corresponding plurality of different locations. Hereinafter, the generative AI-based virtual assistant will often be referred to simply as the "virtual assistant." The various embodiments then refer to the one or more activated electronic markers in instructions communicated to a user by the generative AI-based virtual assistant to assist the user in performing a task pertaining to the vehicle. Activating and referring to electronic markers in the vehicle is particularly helpful to the user (e.g., the driver or other occupant of the vehicle) if the task to be performed involves multiple steps. In the various embodiments, the task pertaining to the vehicle can be, without limitation, operating a vehicle feature, adjusting a vehicle setting, or performing maintenance on the vehicle. The various embodiments described herein provide the functionality of a vehicle owner's manual in interactive digital form, the electronic markers enhancing the user's ability to follow instructions provided by the virtual assistant.

The purpose of the electronic markers is to assist the user in finding the specific locations of controls, features, components, etc., in the vehicle. The electronic markers thus serve as annotations for specific locations in the vehicle. Referring to the electronic markers makes it easier and more effective for a virtual assistant to direct the user to specific locations in the vehicle in connection with performing a task. For example, consider a user who wants help changing the vehicle's air filter. The user might say to the virtual assistant, "Hey Assistant, could you show me how to change the engine air filter? I bought a replacement filter yesterday." The virtual assistant responds with audio (synthesized speech) instructions supplemented as needed with displayed text, diagrams, video, etc. In this example, those instructions might begin with something like, "Yes, User. Please look for an electronic marker labeled 'H.' You'll find it [virtual assistant describes the location of the referenced electronic marker within the passenger compartment]. Just below that electronic marker, you'll see a lever. Pull on that lever to unlatch the hood." The instructions might continue with something like, "Exit the vehicle, raise the hood, and prop it open. Then look for an electronic marker labeled 'A' in the engine compartment [virtual assistant describes more specifically where to find the referenced electronic marker]. The air filter is inside the housing annotated with the 'A' electronic marker." The instructions from the virtual assistant might conclude with an explanation of how to remove and replace the air filter (opening the housing, removing the dirty air filter, installing the new air filter, closing the housing, etc.). This is merely one example of a task the completion of which can be aided by the combination of a generative AI-based virtual assistant and electronic markers installed in various locations in the vehicle that the virtual assistant activates and deactivates as needed. In some embodiments, the instructions, at one or more of the steps, are supplemented, on a display of the vehicle, with photographs, graphics, text, diagrams, video, etc.

Depending on the embodiment, the plurality of different locations for the installed electronic markers can be in the passenger compartment, the engine compartment, the trunk, and/or the frunk of the vehicle. As those skilled in the art are aware, a "frunk" is a storage compartment similar to a trunk located at the front of a vehicle, particularly an electric vehicle (EV).

In some embodiments, the electronic markers are permanent (i.e., the information they convey, when activated, does not change with time). In these embodiments, each electronic marker, when activated (e.g., when it "lights up," becoming visible or noticeable to the user), conveys at least one of a number, a letter, an icon, a shape, and a symbol. Herein, an "icon" refers to a simplified, stylized image that represents a concept, object, or action; a "shape" refers to an external form, contour, or outline of an object, including geometric shapes such as triangles, circles, ellipses, squares, rectangles, hexagons, etc.; and a "symbol" refers broadly to something that represents or stands for something else. In some of these embodiments, the virtual assistant deactivates the electronic markers when they are not in use (i.e., not being referred to by the virtual assistant in connection with communicating instructions to the user). This is one advantage of the electronic markers: when they are not in use, they are not noticeable to the user; they do not clutter or mar the aesthetic appearance of the vehicle.

In some embodiments, the electronic markers are miniature electronic displays that, when activated, dynamically display at least one of a number, a letter, an icon, a shape, and a symbol in accordance with the instructions being conveyed to the user by the virtual assistant at any given time. In some of these embodiments, the virtual assistant deactivates the miniature-display electronic markers when they are not in use (i.e., not being referred to by the virtual assistant in connection with communicating instructions to the user), the inactivated electronic markers being rendered inconspicuously blank.

In some embodiments, the electronic markers are hidden from view but can communicate or otherwise interact with the virtual assistant (e.g., over a wired or wireless communication link). For example, in some embodiments, the hidden markers are radio-frequency identification (RFID) devices or another type of passive or active near-field-communication-based devices. When a user wearing a visual apparatus (e.g., virtual reality (VR) goggles or smart eyeglasses) looks in the general direction of an electronic marker that is currently being referenced by the virtual assistant and the hidden marker's physical location is within the field of view of the visual apparatus, the virtual assistant causes at least one of an augmented-reality number, letter, icon, shape, and symbol to be superimposed over the physical location of the hidden marker. In this particular embodiment, this superimposing of the augmented-reality label in the user's visual apparatus constitutes "activation" of the corresponding hidden electronic marker. For example, in one embodiment, the glove box door of the vehicle might include a hidden marker. When instructions from the virtual assistant for replacing the cabin air filter direct the user to locate a marker labeled "1" (signifying Step 1 of a multistep process) and to open the glove compartment, the virtual assistant might cause the user's visual apparatus to display a superimposed virtual (augmented-reality) "1" over the glove box door where the hidden marker is located, when the user is looking in that direction.

Since some tasks require the user to be outside the vehicle (e.g., replacing a component in the engine compartment or removing the spare tire from the trunk), it can be difficult for the user to receive ongoing instructions, see supplemental visual information, etc. To address this problem, in some embodiments, the virtual assistant communicates at least a portion of the instructions for performing a task to the user via a mobile device carried or worn by the user. That is, the virtual assistant can convey audible (synthesized speech) instructions and/or visual information to the user via the mobile device. In these embodiments, the virtual assistant automatically tailors any visual information provided in accordance with the display capabilities of the mobile device. For example, the virtual assistant simplifies and minimizes visual information conveyed via a smart watch because of a smart watch's limited display size and capabilities. If the mobile device is a smartphone or a tablet computer, the virtual assistant can provide more complete and complex visual information similar to what would be displayed on, e.g., the dashboard display inside the vehicle.

In some embodiments, the user's mobile device can be used to guide the user to a particular electronic marker by conveying audible directions, in real time, from the virtual assistant to the user. For example, a user looking for the oil filter might be told by the virtual assistant, "The electronic marker labeled 'O' near the oil filter is about 8 inches to your left and 2 inches downward toward the ground. That's it. Just another inch or so to your left." In these embodiments, the mobile device provides, to the virtual assistant, local geopositioning information regarding the particular electronic marker as the user is being guided to the particular electronic marker. This is similar to some of the electronic tagging/tracking technologies known in the art that are used to help a user find a lost object (e.g., car keys) to which an electronic tag is attached. As discussed further below, there are other applications in which the user's mobile device can be used advantageously in conjunction with the virtual assistant.

In some embodiments of a virtual assistant enhancement system, the system confirms, to the user, that a maintenance task has been performed correctly. For example, if the user has replaced the oil filter, the virtual assistant confirms, based on sensor data, that the new oil filter has been properly installed and that the oil reservoir has been refilled correctly.

Referring to FIG. 1, it depicts a vehicle 100 in which various embodiments of a virtual assistant enhancement system can be implemented, as discussed in greater detail below. As used herein, a "vehicle" is any form of motorized transport. One example of a "vehicle," without limitation, is an automobile. As shown in FIG. 1, vehicle 100 can include a virtual assistant enhancement system 175, which is described in detail below. Hereinafter, virtual assistant enhancement system 175 will sometimes be referred to simply as the "system 175" for brevity.

In some embodiments, vehicle 100 includes an automated driving system that enables vehicle 100 to operate in a semi-automated or automated driving mode. For example, in some embodiments, vehicle 100 can operate at a high or total level of autonomy (e.g., Society of Automotive Engineers Autonomy Levels 3-5). As indicated in FIG. 1, vehicle 100 includes automated driving module(s) 160 that implement the automated driving system. In other embodiments, vehicle 100 can operate in a semi-automated driving mode by virtue of features such as adaptive cruise-control (ACC), automatic lane-change assistance, automatic lane-keeping assistance, and automatic parking assistance. In some embodiments, such features and others (e.g., automatic collision avoidance) are aspects of an Advanced Driver-Assistance System (ADAS) 170. In still other embodiments, vehicle 100 may be driven manually by a human driver.

As indicated in FIG. 1, the vehicle 100 includes additional elements. It will be understood that, in various embodiments, it may not be necessary for the vehicle 100 to have all the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1, including virtual assistant enhancement system 175. While the various elements are shown as being located within the vehicle 100 in FIG. 1, it will be understood that one or more of these elements can be located external to the vehicle 100. Further, the elements shown may be physically separated by large distances. Some of the possible elements of the vehicle 100 are shown in FIG. 1. However, a description of many of the elements in FIG. 1 will be provided after the discussion of FIGS. 2-6 for purposes of brevity of this description.

As discussed above, the system 175 includes a generative AI-based virtual assistant that operates in conjunction with a plurality of electronic markers 150 installed in the vehicle 100 in a corresponding plurality of different locations (e.g., within the passenger compartment, engine compartment, trunk, and/or frunk). That is, the virtual assistant activates and then refers to one or more of the plurality of electronic markers 150 in providing instructions to a user (e.g., a driver or other occupant of the vehicle 100) to assist the user in performing a task pertaining to the vehicle.

In some embodiments, a vehicle 100 can communicate with other network nodes 180 (e.g., other connected vehicles, cloud servers, edge servers, roadside units, infrastructure devices, etc.) via a network 190. In some embodiments, network 190 includes the Internet. In communicating with the other network nodes 180, vehicle 100 can employ wireless communication technologies such as cellular data, Bluetooth®, Bluetooth® Low Energy (LE), and Dedicated Short-Range Communications (DSRC).

FIG. 2 is a block diagram of a virtual assistant enhancement system 175, in accordance with an illustrative embodiment of the invention. In FIG. 2, the system 175 includes one or more processors 205 to which a memory 210 is communicably coupled. The one or more processors 205 may be dedicated to the system 175, the system 175 may share one or more of the processors 110 of vehicle 100, or the system 175 may access the one or more processors 110 of vehicle 100 through a data bus or another communication path, depending on the embodiment. Memory 210 stores a marker reference module 215 and a generative AI module 220. The memory 210 is a random-access memory (RAM), read-only memory (ROM), a hard-disk drive, a flash memory, or other suitable non-transitory memory for storing the modules 215 and 220. The modules 220 are, for example, machine-readable program code (executable instructions) that, when executed by the one or more processors 205, causes the one or more processors 205 to perform the various functions disclosed herein.

As shown in FIG. 2, system 175 makes use of a plurality of electronic markers 150 installed in different locations in vehicle 100. In FIG. 2, a line with opposing arrows is shown connecting the system 175 with the electronic markers 150 to indicate that the system 175 communicates with the electronic markers 150 through a hardwired or wireless communication link. For example, in some embodiments, the electronic markers 150 are permanent with regard to the label/information (number, letter, icon, shape, symbol, etc.) they convey to the user but are inconspicuously inactive (turned off) until they are activated and referred to by the virtual assistant in instructions to the user, at which time they "light up" to become visible and noticeable to the user. In another embodiment mentioned above, the electronic markers 150 are miniature displays that can dynamically display different labels/content over time under control of and in accordance with the needs of the virtual assistant at the time. In some embodiments, the miniature-display-type electronic markers 150 are light-emitting diode (LED) displays. In other embodiments, the miniature-display-type electronic markers 150 are liquid crystal displays (LCDs). As mentioned above, in still other embodiments, the electronic markers 150 are hidden from view and support augmented-reality labels that the virtual assistant causes to be displayed in a visual apparatus (e.g., smart eyeglasses or VR goggles) of the user when the user is looking in a direction such that a hidden electronic marker 150 is within the field of view of the visual apparatus. The system 175 can use sensor data from sensor system 120 (e.g., images from one or more cameras in the passenger compartment) and/or positioning and sensing capabilities of the visual apparatus itself to detect the gaze direction of the user, in those embodiments. The virtual assistant is aware of the precise location of each installed hidden electronic marker 150 in the vehicle 100.

As also shown in FIG. 2, virtual assistant enhancement system 175 can store various kinds of data in a database 225. For example, the system 175 can store electronic markers registry 230, user data 232, and vehicle data 235. Electronic markers registry 230 is a data structure that keeps track of the electronic markers 150 of whatever type installed in a vehicle 100 and their respective locations in the vehicle. This information enables the virtual assistant to determine which electronic marker 150 is closest to a location in the vehicle that is implicated by instructions communicated to the user by the virtual assistant. User data 232 includes various kinds of information that system 175 learns over time regarding the user(s) who operation or occupy the vehicle 100, particularly their habits and preferences. That information enables the virtual assistant to be customized for the particular user or users who interact with it. Vehicle data 235 includes a variety of different kinds of information about the vehicle 100 such as technical information, vehicle schematics and blueprints, information regarding features and functions, information concerning owner-performable maintenance, and sensor data from sensor system 120. The vehicle data 235 enables system 175, in combination with the electronic markers 150, to function much like an interactive digital owner's manual for the vehicle 100.

As also shown in FIG. 2, the system 175 can communicate with other network nodes 240 (e.g., a user's mobile device, Internet servers, etc.) via a network 245. In communicating with the other network nodes 240, system 175 can employ wireless communication technologies such as cellular data, Bluetooth®, Bluetooth® Low Energy (LE), and Dedicated Short-Range Communications (DSRC). In some embodiments, the network 245 coincides, at least in part, with the network 190 used by vehicle 100 generally (see FIG. 1).

Marker reference module 215 generally includes machine-readable program code that, when executed by the one or more processors 205, causes the one or more processors 205 to activate, via a generative AI-based virtual assistant of the vehicle 100, one or more of the plurality of electronic markers 150. To "activate" an electronic marker 150 means to turn it on so it is visible to the user or, in the case of a hidden electronic marker 150, to cause an augmented-reality label to be superimposed over the physical location of the hidden electronic marker 150 in a visual apparatus worn by the user, when the user is looking in the direction of the physical location and the physical location is within the field of view of the visual apparatus.

Marker reference module 215 also includes machine-readable program code that, when executed by the one or more processors 205, causes the one or more processors 205 to refer to the one or more activated electronic markers 150 in instructions communicated to a user by the generative AI-based virtual assistant to assist the user in performing a task pertaining to the vehicle 100. Marker reference module 215 is an aspect of the generative AI-based virtual assistant described herein. That is, marker reference module 215 and generative AI module 220, together, implement the generative AI-based virtual assistant in the various embodiments discussed herein. As discussed above, the purpose of referring to the activated electronic markers 150 is to assist the user in finding the specific locations of controls, features, components, etc., in the vehicle 100. In other words, the electronic markers 150, when activated, serve as annotations for specific locations in the vehicle 100. Some specific examples of how the virtual assistant might refer to electronic markers 150 are discussed above.

Generative AI module 220 generally includes machine-readable program code that, when executed by the one or more processors 205, causes the one or more processors 205 to, among other things, communicate instructions to a user to assist the user in performing a task pertaining to the vehicle 100. In some embodiments, generative AI module 220 includes a large language model (LLM). In other embodiments, generative AI module 220 includes a different kind of foundation model and/or a diffusion model. As those skilled in the art are aware, such generative AI models are trained using a large amount of data. A foundation model or generic LLM can be further trained and specialized for vehicular applications such as the various embodiments of a virtual assistant enhancement system 175 described herein. Further, such a model can continue to be trained as needed on an ongoing basis to improve its performance and capabilities and to tailor its operation for a particular user or set of users (refer to the discussion of user data 232 above). Generative AI module 220 also includes text-to-speech capability that enables the system 175 to communicate with a user via synthesized speech in a natural-language-based, conversational manner. As those skilled in the art are aware, a LLM, for example, enables the system 175 to be quite adept at both understanding a user's speech and outputting its own nuanced synthetic speech. Generative AI models such as LLMs are optimized for the understanding and generation of language. It is that capability of generative AI models that makes them attractive for applications such as a vehicular virtual assistant.

Figure 3:
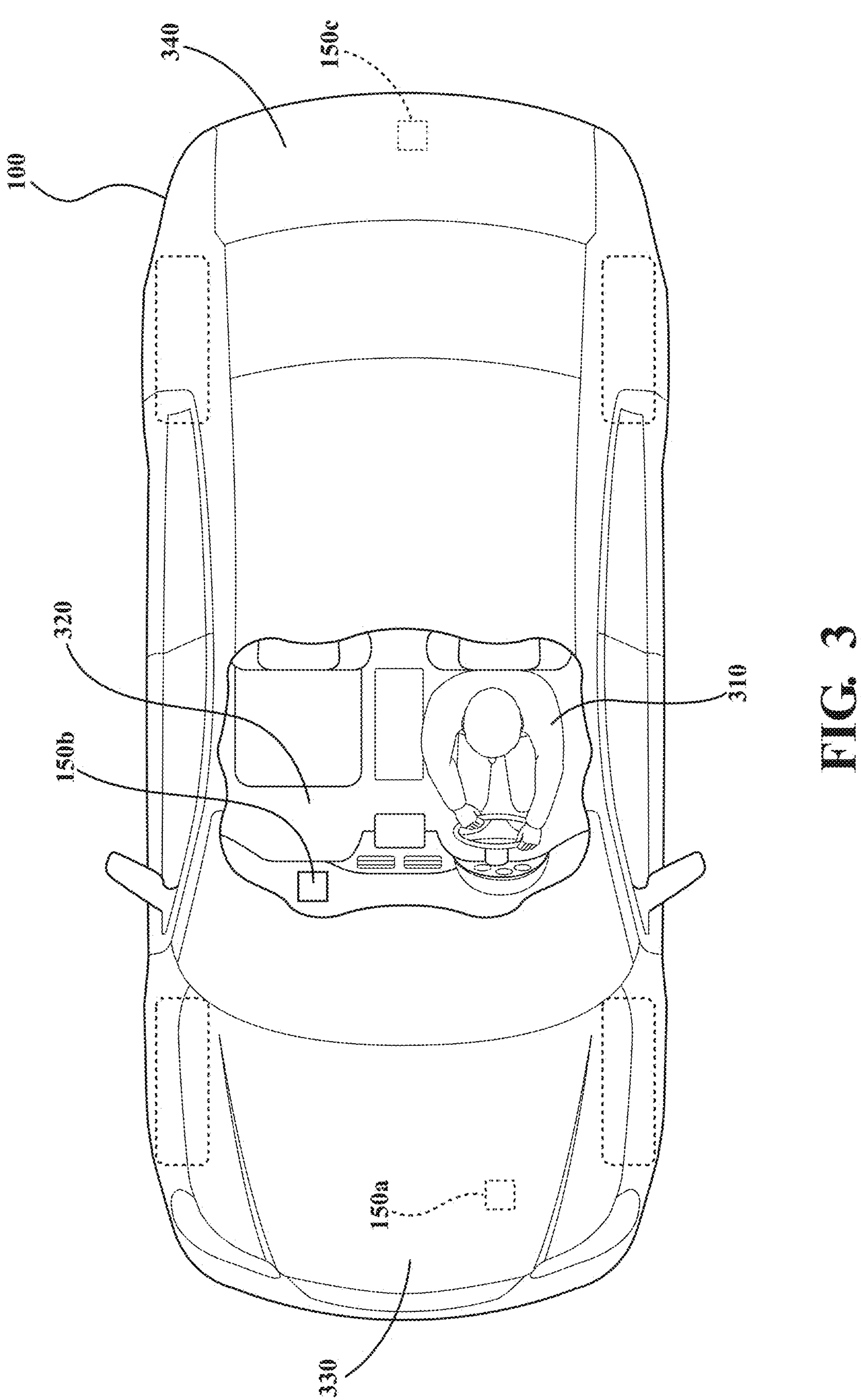
FIG. 3 illustrates a vehicle in which electronic markers have been installed in various locations, in accordance with an illustrative embodiment of the invention.

FIG. 3 illustrates a vehicle 100 in which electronic markers 150 have been installed in various locations, in accordance with an illustrative embodiment of the invention. As discussed above, FIG. 3 illustrates that electronic markers 150 can be installed (placed or situated) in the engine compartment 330 (electronic marker 150*a*), passenger compartment 320 (electronic marker 150*b*), and/or trunk 340 (electronic marker 150*c*). As mentioned above, electronic markers 150 can also be installed in the frunk of a vehicle equipped with one (e.g., an EV). The dimensions of a given electronic marker 150 can vary, depending on the embodiment, and the various electronic markers 150 installed in a vehicle 100 can be of varying sizes, depending on their locations. In one embodiment, an electronic marker 150 has a small footprint (e.g., 2 cm×2 cm).

As discussed above, in some embodiments, an electronic marker 150 in the plurality of electronic markers 150, when activated, conveys at least one of a permanent number, letter, icon, shape, and symbol. That is, in some embodiments, system 175 employs permanent electronic markers 150 that "light up" with the same label whenever they are activated and referenced by the virtual assistant. In some embodiments, the virtual assistant deactivates electronic markers 150 that are not currently being referred to in connection with instructions communicated to a user.

As also discussed above, in some embodiments, an electronic marker 150 in the plurality of electronic markers 150 is a miniature electronic display that, when activated, dynamically displays at least one of a number, a letter, an icon, a shape, and a symbol in accordance with the instructions being conveyed to the user by the virtual assistant at any given time. In some of those embodiments, when a miniature-display-type electronic marker 150 is not needed, the virtual assistant deactivates it, rendering it inconspicuously blank.

As also discussed above, in still other embodiments, an electronic marker 150 in the plurality of electronic markers 150 is hidden from view (e.g., embedded in a surface), and the generative AI-based virtual assistant causes at least one of an augmented-reality number, letter, icon, shape, and symbol to be superimposed over the physical location of the hidden electronic marker 150 in a visual apparatus worn by the user when the field of view of the visual apparatus includes the physical location of the hidden electronic marker 150. As also mentioned above, in some embodiments, a hidden electronic marker 150 is a RFID device or another type of passive or active near-field-communication-based device.

It should be noted that, in some embodiments, the system 175 employs, in the same vehicle 100, more than one of the different types of electronic markers 150 described above.

Figure 4:
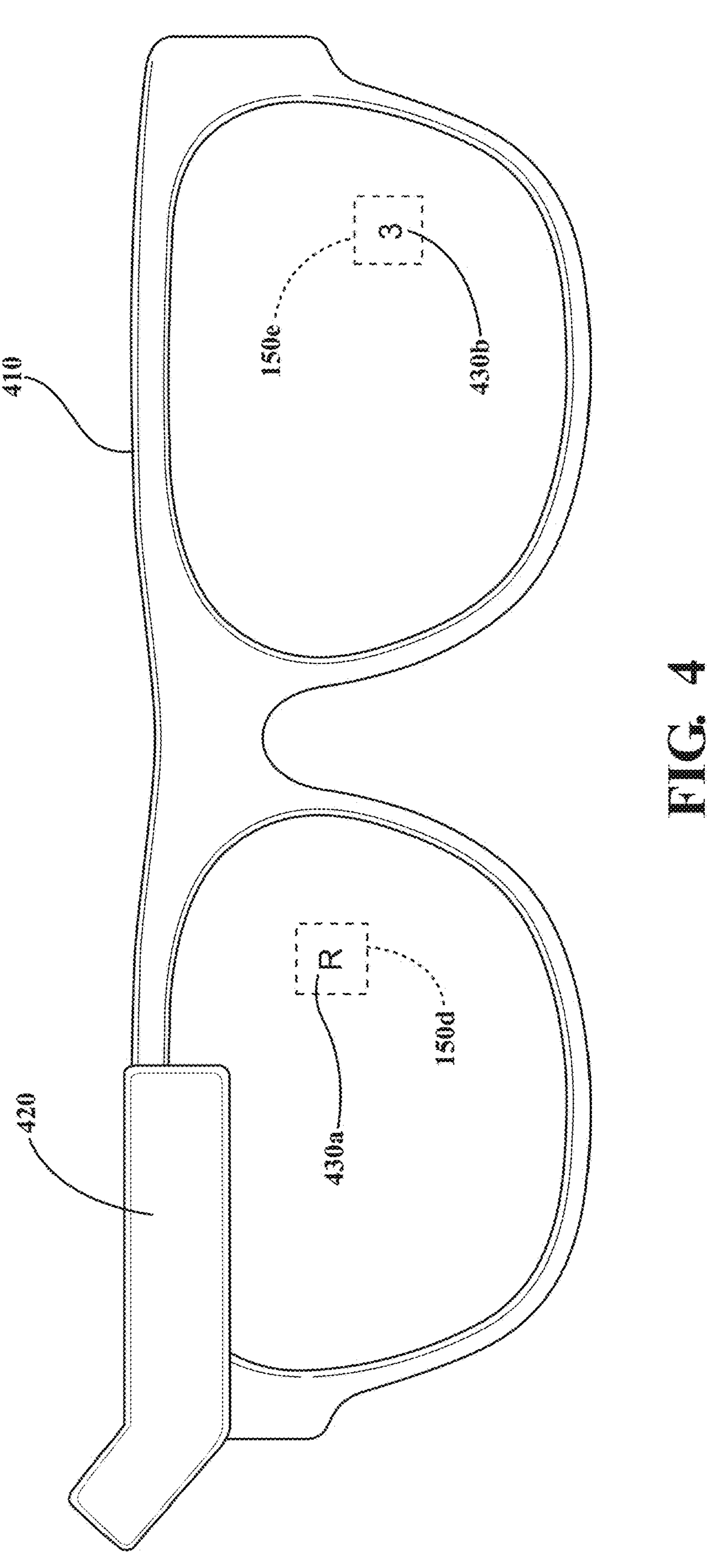
FIG. 4 illustrates a pair of smart eyeglasses used to view augmented-reality labels superimposed over the physical locations of hidden electronic markers in a vehicle, in accordance with an illustrative embodiment of the invention.

FIG. 4 illustrates a pair of smart eyeglasses 410 used to view augmented-reality labels 430 superimposed over the physical locations of hidden electronic markers 150 in a vehicle 100, in accordance with an illustrative embodiment of the invention. In FIG. 4, the smart eyeglasses 410 include electronic components 420 (e.g., a processor, memory, sensors such as a camera, etc.). As illustrated in FIG. 4, when the user wearing the smart eyeglasses 410 looks in the direction of the hidden electronic markers 150*d* and 150*e*, the virtual assistant of the system 175 causes the label 430*a* ("R") to be superimposed over the location of the hidden electronic marker 150*d* and the label 430*b* ("3") to be superimposed over the location of the hidden electronic marker 150*e*. As those skilled in the art are aware, this is an example of "augmented reality," in which virtual content is superimposed over a real scene. In embodiments employing hidden electronic markers 150, the associated labels 430 can display dynamically varying information in accordance with the present needs of the virtual assistant in a manner similar to the miniature-displays embodiments discussed above. It should be noted that when the virtual assistant is not currently referencing a given hidden electronic marker 150 toward which the user is gazing, the system 175, in some embodiments, does not display a superimposed label 430 in the user's visual apparatus. This avoids cluttering the user's view, especially within the passenger compartment where there are likely to be more hidden electronic markers 150.

Figure 5:
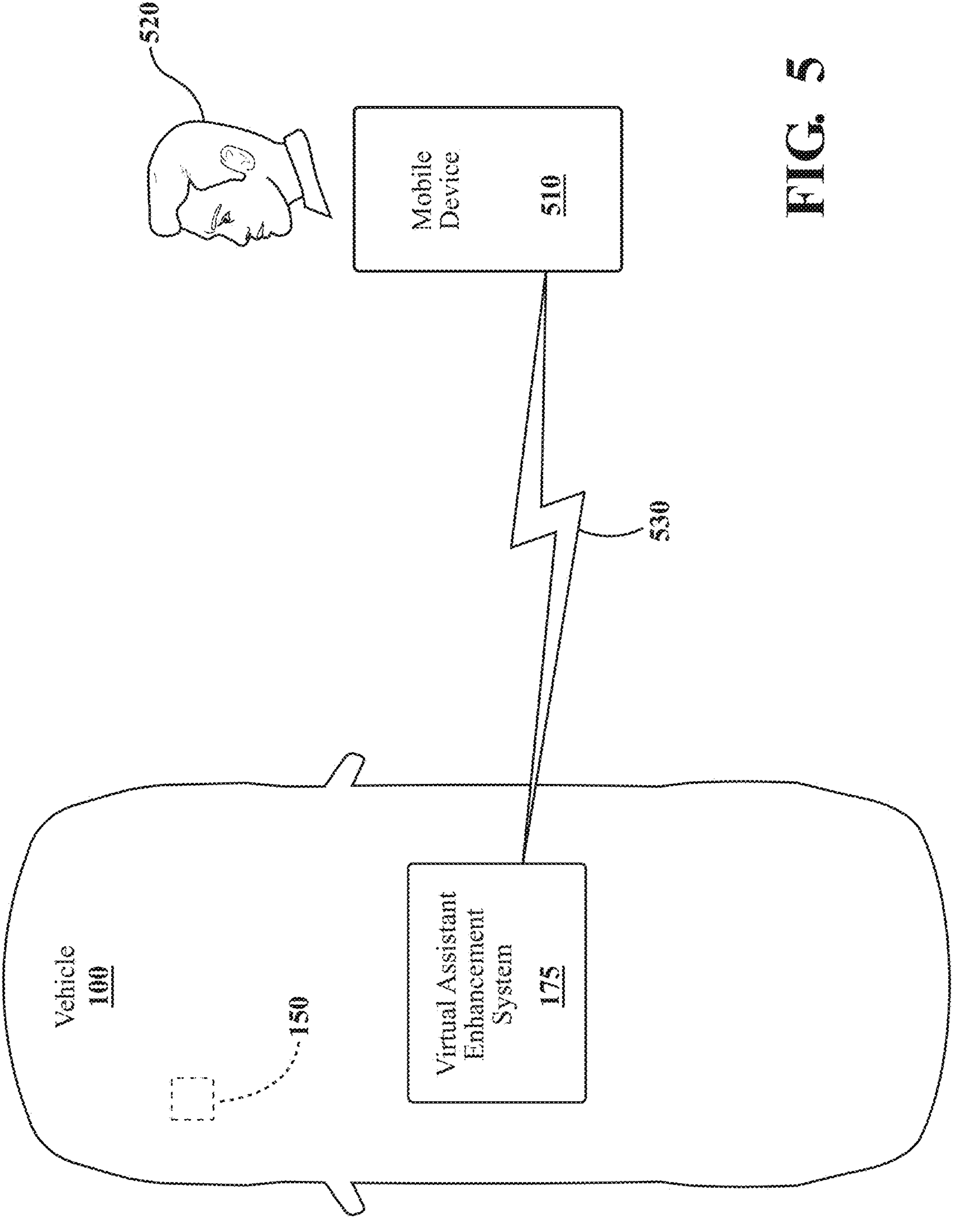
FIG. 5 illustrates a user's mobile device being used to convey instructions to the user from a virtual assistant in a vehicle, in accordance with an illustrative embodiment of the invention.

FIG. 5 illustrates a user's mobile device 510 being used to convey instructions to the user 520 (e.g., a driver or other vehicle occupant) from a virtual assistant enhancement system 175 in the vehicle 100, in accordance with an illustrative embodiment of the invention. As discussed above, some tasks, especially maintenance, require the user to be outside the vehicle (e.g., to access the engine compartment 330 or trunk 340). As discussed above, in some embodiments, the user's mobile device 510 can be used to guide the user 520 to a particular electronic marker 150 by conveying audible directions, in real time, from the virtual assistant to the user. For example, a user looking for the oil filter might be told by the virtual assistant, "The electronic marker labeled 'O' near the oil filter is about 8 inches to your left and 2 inches downward toward the ground. That's it. Just another inch or so to your left." In these embodiments, the system 175 and the mobile device 510 communicate with each other over a communication link 530. Also, in these embodiments, the mobile device 510 provides, to the virtual assistant of the system 175, local geopositioning information regarding the particular electronic marker 150 as the user is being guided to the particular electronic marker 150.

More generally, as discussed above, in some embodiments, the system 175 communicates at least a portion of the instructions to the user via a mobile device 510 carried or worn by the user 520, and the generative AI-based virtual assistant (215, 220) tailors the relevant instructions in accordance with the display capabilities of the mobile device 510. For example, the virtual assistant simplifies and minimizes visual information conveyed via a smart watch because of a smart watch's limited display size and capabilities. If the mobile device 510 is a smartphone or a tablet computer, the virtual assistant can provide more complete and complex visual information similar to what would be displayed on, e.g., the dashboard display inside the vehicle 100.

Another example of a use case in which a mobile device 510 can be helpful is inflating a tire. In such an embodiment, the virtual assistant of system 175 can communicate audibly to the user when the correct tire pressure has been reached based on sensor data from the sensor system 120 of the vehicle 100. This obviates the need for the user to stop and monitor the status of the tire pressure on the instrument panel of vehicle 100 while trying to inflate the tire.

As discussed above, in some embodiments of the system 175, the system confirms, to the user, that a maintenance task has been performed correctly. For example, if the user has replaced the oil filter, the virtual assistant (220) confirms, based on sensor data, that the new oil filter has been properly installed and that the oil reservoir has been refilled correctly.

Figure 6:
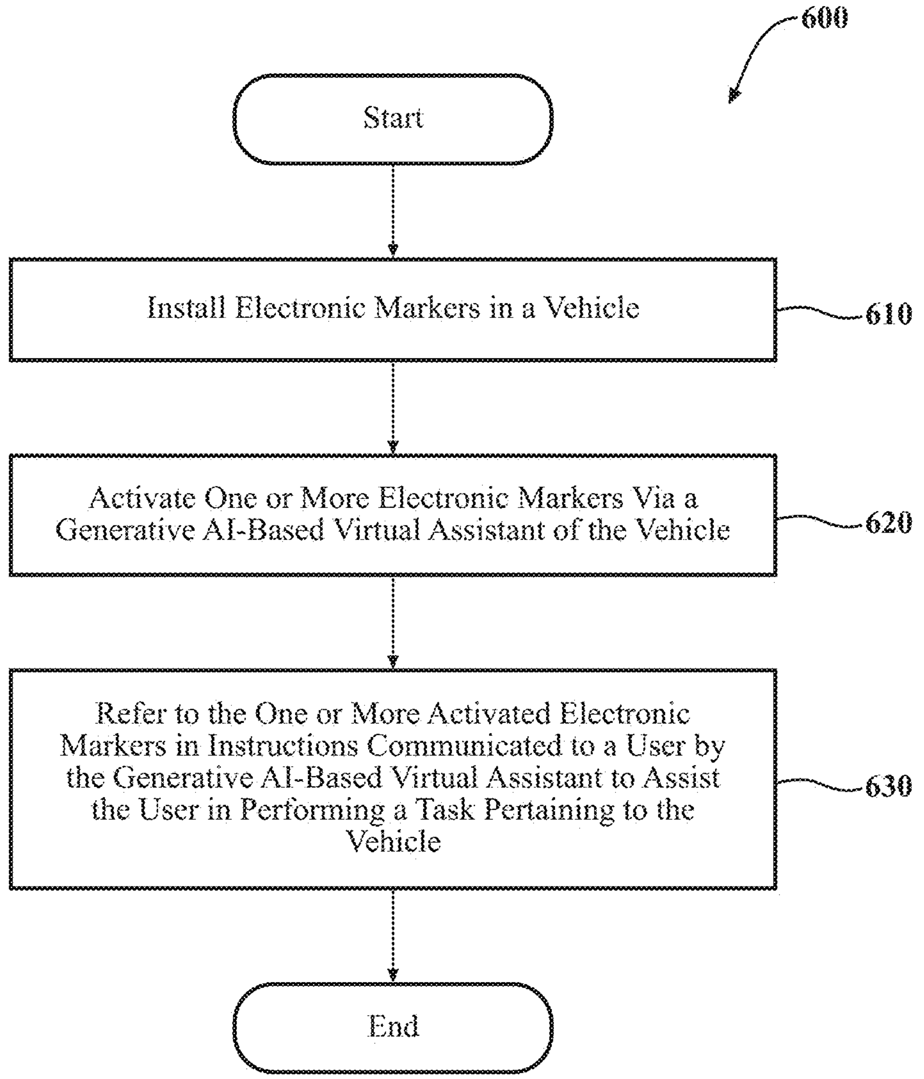
FIG. 6 is a flowchart of a method of enhancing instructions provided by a vehicular virtual assistant, in accordance with an illustrative embodiment of the invention.

FIG. 6 is a flowchart of a method 600 of enhancing instructions provided by a vehicular virtual assistant, in accordance with an illustrative embodiment of the invention. Method 600 will be discussed from the perspective of virtual assistant enhancement system 175 in FIG. 2. While method 600 is discussed in combination with virtual assistant enhancement system 175, it should be appreciated that method 600 is not limited to being implemented within virtual assistant enhancement system 175, but virtual assistant enhancement system 175 is instead one example of a system that may implement method 600.

At block 610, a plurality of electronic markers 150 are installed in a vehicle 100 in a corresponding plurality of different locations. In some embodiments, this is one of the steps of manufacturing the vehicle 100. As discussed above, depending on the embodiment, the plurality of different locations for the installed electronic markers 150 can be in the passenger compartment 320, the engine compartment 330, the trunk 340, and/or the frunk of the vehicle 100. As also discussed above, the electronic markers 150 can be any of several different types, depending on the embodiment. The different types of markers are discussed in detail above (see, in particular, the discussion of FIG. 3.).

At block 620, marker reference module 215 activates, via a generative AI-based virtual assistant of the vehicle 100 of which it is one aspect, one or more of the plurality of electronic markers 150. As discussed above, to "activate" an electronic marker 150 means to turn it on so it is visible and noticeable to the user or, in the case of a hidden electronic marker 150, to cause an augmented-reality label 430 to be superimposed over the physical location of the hidden electronic marker 150 in a visual apparatus 410 worn by the user when the user is looking in the direction of the physical location and the physical location is within the field of view of the visual apparatus 410.

At block 630, marker reference module 215 refers to the one or more activated electronic markers 150 in instructions communicated to a user 520 by a generative AI-based virtual assistant of the vehicle 100 to assist the user 520 in performing a task pertaining to the vehicle 100. As discussed above, the task pertaining to the vehicle 100 can be, without limitation, operating a vehicle feature, adjusting a vehicle setting, or performing maintenance on the vehicle. Examples of how the virtual assist might refer to an electronic marker 150 in some practical use cases are discussed above.

In some embodiments, method 600 includes additional actions. For example, in some embodiments, the system 175 confirms to the user 520 via the generative AI-based virtual assistant (215, 220), that a maintenance task on the vehicle the user 520 has completed with the help of the virtual assistant (e.g., changing the sparkplugs) has been performed correctly.

As discussed above, in some embodiments a user's mobile device 510 can convey instructions to the user 520 when the user 520 is outside the vehicle to perform a task (e.g., replacing a component in the engine compartment 330, inflating a tire, etc.) and/or guide the user 520 to the location of a specific electronic marker 150 referred to in the instructions communicated by the virtual assistant.

FIG. 1 will now be discussed in full detail as an example vehicle environment within which the systems and methods disclosed herein may be implemented. In some instances, the vehicle 100 can be configured to switch selectively between an automated mode, one or more semi-automated operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the vehicle 100 can be an automated vehicle. As used herein, "automated vehicle" refers to a vehicle that operates in an automated mode. "Automated mode" refers to navigating and/or maneuvering a vehicle along a travel route using one or more computing devices to control the vehicle with minimal or no input from a human driver/operator. In one implementation, the vehicle 100 is configured with one or more semi-automated operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more implementations, the vehicle 100 operates autonomously according to a particular defined level of autonomy.

The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the vehicle 100 itself, including the operational status of various vehicle components and systems.

In one or more arrangements, the vehicle sensors 121 can be configured to detect, and/or sense position and/orientation changes of the vehicle 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensors 121 can be configured to detect, and/or sense one or more characteristics of the vehicle 100. In one or more arrangements, the vehicle sensors 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 are discussed above. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 and/or the automated driving module(s) 160 can be operatively connected to communicate with the various vehicle systems 140 and/or individual components thereof. For example, returning to FIG. 1, the one or more processors 110 and/or the automated driving module(s) 160 can be in communication to send and/or receive information from the various vehicle systems 140 to control the movement, speed, maneuvering, heading, direction, etc. of the vehicle 100. The one or more processors 110 and/or the automated driving module(s) 160 may control some or all of these vehicle systems 140 and, thus, may be partially or fully automated.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In some implementations, the vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine the position and velocity of the vehicle 100. The automated driving module(s) 160 can determine the location of obstacles, or other environmental features including traffic signs, trees, shrubs, neighboring vehicles, pedestrians, etc.

The automated driving module(s) 160 can be configured to determine travel path(s), current automated driving maneuvers for the vehicle 100, future automated driving maneuvers and/or modifications to current automated driving maneuvers based on data acquired by the sensor system 120, driving scene models, and/or data from any other suitable source. “Driving maneuver” means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured can be configured to implement determined driving maneuvers. The automated driving module(s) 160 can cause, directly or indirectly, such automated driving maneuvers to be implemented. As used herein, “cause” or “causing” means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140). The noted functions and methods will become more apparent with a further discussion of the figures.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-6, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase “computer-readable storage medium” means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the “C” programming language or similar programming languages. The program code can execute entirely on the user’s computer, partly on the user’s computer, as a stand-alone software package, partly on the user’s computer and partly on a remote computer, or entirely on the remote computer or server. In the latter scenario, the remote computer can be connected to the user’s computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word “comprise” and variations thereof, such as, “comprises” and “comprising” are to be construed in an open, inclusive sense, that is, as “including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions. The term "module," as used herein, is not intended, under any circumstances, to invoke interpretation of the appended claims under 35 U.S.C. § 112(f).

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system, comprising:

a plurality of electronic markers installed in a vehicle in a corresponding plurality of different locations;

a processor; and a memory storing machine-readable program code that, when executed by the processor, causes the processor to:

activate, via a generative artificial intelligence (AI)-based virtual assistant of the vehicle, one or more of the plurality of electronic markers; and refer to the one or more of the plurality of electronic markers in instructions communicated to a user by the generative AI-based virtual assistant to assist the user in performing a task pertaining to the vehicle, wherein the task pertaining to the vehicle is operating a vehicle feature, adjusting a vehicle setting, or performing maintenance on the vehicle and the plurality of electronic markers are miniature displays that, when activated, dynamically display at least one of a number, letter, icon, shape, or symbol in accordance with the instructions.

2. The system of claim 1, wherein the corresponding plurality of different locations are in at least one of a passenger compartment, an engine compartment, a trunk, or a frunk of the vehicle.

3. The system of claim 1, wherein the machine-readable program code includes further program code that, when executed by the processor, causes the processor to confirm, to the user via the generative AI-based virtual assistant, that the maintenance has been performed correctly.

4. The system of claim 1, wherein the machine-readable program code includes further program code that, when executed by the processor, causes the processor to guide the user to a particular electronic marker in the plurality of electronic markers by conveying audible directions from the generative AI-based virtual assistant to the user via a mobile device carried or worn by the user and the mobile device provides geopositioning information to the generative AI-based virtual assistant as the user is being guided to the particular electronic marker.

5. The system of claim 1, wherein the machine-readable program code includes program code that, when executed by the processor, causes the processor to communicate at least a portion of the instructions to the user via a mobile device carried or worn by the user and the generative AI-based virtual assistant tailors the at least a portion of the instructions in accordance with display capabilities of the mobile device.

6. A non-transitory computer-readable medium storing program code that, when executed by a processor, causes the processor to:

activate, via a generative artificial intelligence (AI)-based virtual assistant of a vehicle, one or more of a plurality of electronic markers installed in the vehicle in a corresponding plurality of different locations; and refer to the one or more of the plurality of electronic markers in instructions communicated to a user by the generative AI-based virtual assistant to assist the user in performing a task pertaining to the vehicle, wherein the task pertaining to the vehicle is operating a vehicle feature, adjusting a vehicle setting, or performing maintenance on the vehicle and the plurality of electronic markers are miniature displays that, when activated, dynamically display at least one of a number, letter, icon, shape, or symbol in accordance with the instructions.

7. A method, comprising:

installing, in a vehicle, a plurality of electronic markers in a corresponding plurality of different locations;

activating, via a generative artificial intelligence (AI)-based virtual assistant of the vehicle, one or more of the plurality of electronic markers; and referring to the one or more of the plurality of electronic markers in instructions communicated to a user by the generative AI-based virtual assistant to assist the user in performing a task pertaining to the vehicle, wherein the task pertaining to the vehicle is operating a vehicle feature, adjusting a vehicle setting, or performing maintenance on the vehicle and the plurality of electronic markers are miniature displays that, when activated, dynamically display at least one of a number, letter, icon, shape, or symbol in accordance with the instructions.

8. The method of claim 7, wherein the corresponding plurality of different locations are in at least one of a passenger compartment, an engine compartment, a trunk, or a frunk of the vehicle.

9. The method of claim 7, further comprising confirming, to the user via the generative AI-based virtual assistant, that the maintenance has been performed correctly.

10. The method of claim 7, further comprising guiding the user to a particular electronic marker in the plurality of electronic markers by conveying audible directions from the generative AI-based virtual assistant to the user via a mobile device carried or worn by the user, wherein the mobile device provides geopositioning information to the generative AI-based virtual assistant as the user is being guided to the particular electronic marker.

11. The method of claim 7, wherein at least a portion of the instructions is communicated to the user via a mobile device carried or worn by the user and the generative AI-based virtual assistant tailors the at least a portion of the instructions in accordance with display capabilities of the mobile device.

* * * * *